Oct. 10, 1967   NORIYOSHI TAKAHASHI   3,346,793
STARTING METHOD FOR DOUBLE SPEED SALIENT-POLE
TYPE SYNCHRONOUS MACHINES
Filed July 14, 1964                                   2 Sheets-Sheet 1

INVENTOR
Noriyoshi Takahashi
By Paul M. Craig, Jr.
ATTORNEY $$\sum_{r=1}^{8} e_r = 0$$

$$\sum_{\substack{r=1 \\ r \neq 4,8}}^{8} e_r = 2e$$

INVENTOR
Noriyoshi Takahashi

By: Paul M. Craig, Jr.

ATTORNEY

United States Patent Office 3,346,793
Patented Oct. 10, 1967

3,346,793
STARTING METHOD FOR DOUBLE SPEED
SALIENT-POLE TYPE SYNCHRONOUS
MACHINES
Noriyoshi Takahashi, Hitachi-shi, Japan, assignor to Hitachi, Ltd., Tokyo, Japan, a corporation of Japan
Filed July 14, 1964, Ser. No. 382,482
Claims priority, application Japan, July 26, 1963, 38/37,561
6 Claims. (Cl. 318—173)

This invention relates to a method for starting a synchronous machine having a number of armature and field poles and more particularly to a starting method suitable for pole number changeable synchronous machines of the salient field pole type.

An object of the present invention is to provide a starting method of the kind specified wherein the starting characteristics of the machine are improved.

Another object of the present invention is to provide a starting method of the kind specified, in which the field winding is free from any undesirable effects heretofore liable to occur during the starting of synchronous machine and by which smooth starting of the same is accomplished.

A further object of the present invention is to provide a starting method of the kind specified, in which the field winding does not affect undesirably the starting of synchronous machines.

Figure 1:
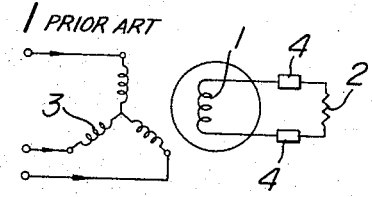
Figure 2:
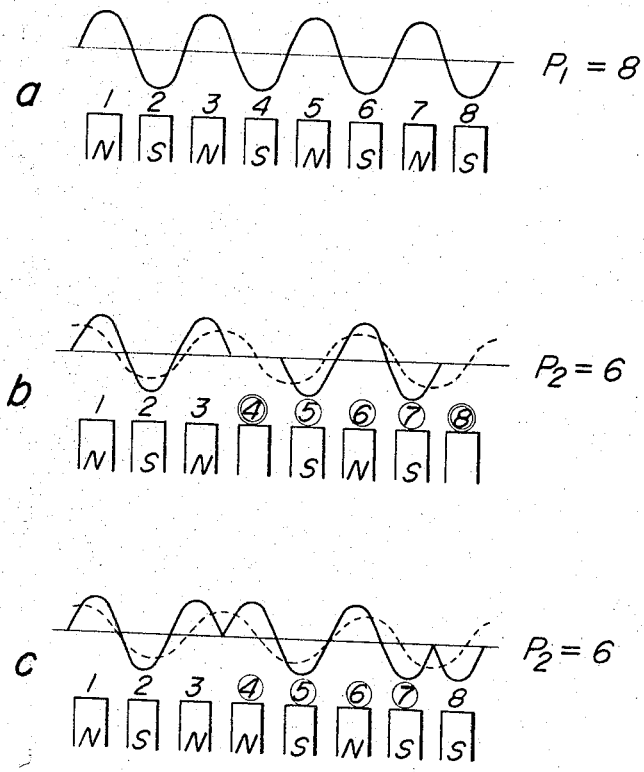
Figure 3:
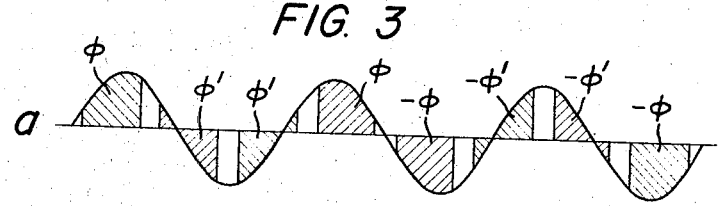
Figure 3:
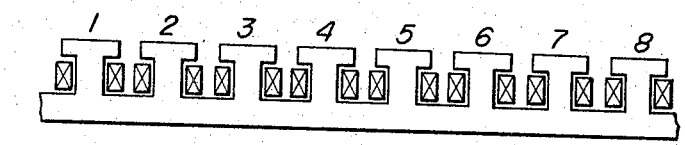
Figure 3:
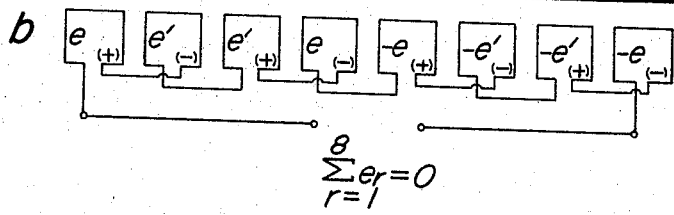
Figure 3:
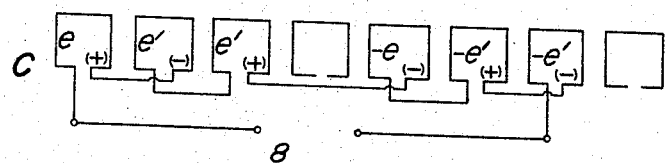

There are other objects and particularities of the present invention, which will be made obvious from the following detailed description of the invention, with reference to the accompanying drawings, in which:

FIG. 1 is a conventional circuit diagram for starting a synchronous machine as an asynchronous machine;

FIGS. 2a, 2b, and 2c are explanatory schematic diagrams to show conventional methods of changing a number of poles of the double speed salient pole type synchronous machine, the diagrams being accompanied with flux curves induced by poles, respectively; and FIG. 3 shows the relationship between a magnetomotive force produced by the armature windings at a certain instant accompanied by a schematic diagram of the induced voltages in field coils of respective magnetic poles when starting in accordance with the method of the present invention.

When a synchronous machine of a large capacity is started as an asynchronous one, a discharge resistance 2 is usually connected across the field winding 1, as shown in FIG. 1. This is a well known method of starting synchronous machines by a self starting method wherein the connections of the field winding 1 are usually short-circuited through a discharge resistance 2 and are not connected to a DC current exciting system, as shown in FIGURE 1. The synchronous machine in question may or may not have damper windings, etc. to facilitate starting, as is well known. Numeral 3 designates the stator or armature winding, and 4 the slip rings and brushes. In starting, multiphase alternating voltage, for example three phase alternating voltage, is applied to the armature winding 3. As the speed of the machine approaches synchronous speed, the discharge resistor 2 is disconnected and the field winding is excited with a DC current applied to its terminal in a well known manner. By means of the above arrangement, the machine insulation is protected against electric insulation breakdown by virtue of over voltage that is induced in the field winding during starting of the machine, by the applied voltage. However, this arrangement for starting a synchronous motor has a defect that total torque necessary for starting decreases abruptly at about the middle of the starting operation. This is due to a reversal of the torque caused by current flowing through the field winding circuit. See page 642, FIGURE 48 of Electrical Engineering Handbook (in Japanese), fifth edition published by the Japanese Institute of Electrical Engineers. Though the decrease is not serious for a motor of a small capacity, it is serious or even fatal for a machine of a large capacity, especially such as a reversible motor-generator synchronous machine used in a pumped storage hydro-electric generating plant. Many attempts have been made to obtain a sufficient starting torque and at the same time to avoid over voltage in the field windings. All of them, however, require complicated and expensive to manufacture structures.

In the present invention it is proposed to start a synchronous machine by a method in which the number of poles in the armature winding is made different from the number of poles in the stator winding before multiphase alternating voltage is applied to the armature winding. For example, when the armature winding is of 8 poles, the rotor field winding circuit is connected in 6 poles, and when the armature winding is of 6 poles, the rotor field winding circuit is connected in 8 poles. During starting, other than the above mentioned reconnection of the number of poles in the armature winding relative to the number of poles in the field winding, starting of the synchronous motor is entirely in accord with established prior art practice as outlined above in connection with FIGURE 1.

The effects of changing a number of poles in a known manner with conventional synchronous machines will be described with relation to FIGURES 2a, through 2c. These effects will be explained in the case of a field winding in a synchronous state where field coils are not illustrated for the sake of simplicity because the configuration is well known. It is to be noted that the manner of rotor excitation explained above with respect to FIGURES 2a through 2c can also be used in the present invention as will be explained more fully hereinafter.

In accordance with the prior art, a method and apparatus for changing a number of poles of double speed, salient pole-type synchronous machines during running has been described in detail in CIGRE Report, 1954, No. 109, "Variable Speed Synchronous Machines for Hydro-Electric or Pumped Storage Power Stations," by J. Tittel, and also have been described in U.S. Patent Number 1,770,871 to P. L. Alger. FIGURES 2a through 2c illustrate the resultant flux fields produced in accordance with certain known methods of changing the number of poles of known, double speed, salient pole-type synchronous machines.

FIG. 2a, shows schematically in linear fashion 8 salient magnetic field poles of the same configuration which when embodied in a synchronous machine are disposed circumferentially with uniform spacings. When changing the number of effective poles, in the manner as shown in FIG. 2b and FIG. 2c, respectively, equal number of poles in the stator and rotor have been employed heretofore. It is assumed that the numbers of effective poles of both armature winding and field winding are changeable between $p_1$ and $p_2$ (where $p_1 > p_2$ can be any number), for example $p_1/p_2 = 8/6$. Such pole number changeable synchronous machines are usually used in a pumped storage-type hydro-electric generating plant as reversible motor-generator units as described in the above cited CIGRE Report.

When the machine is operated in accordance with the prior art with $p_1 = 8$, it is the same as an ordinary synchronous machine. When the machine is operated with $p_2 = 6$ the 4th and 8th poles are demagnetized while the 5th, 6th and 7th poles are reversed in polarities from those when the poles are $p_1 = 8$, as shown in FIG. 2b. In another manner, the 4th, 5th, 6th and 7th poles may be reversed in polarities from those when the poles are $p_1 = 8$, as shown in FIG. 2c. Though the form of flux in an air gap produced by each field pole is as shown by solid lines, the overall distribution of fluxes becomes six pole components as shown by dotted lines in FIGS. 2b and 2c and it is utilized to produce torque.

In the synchronous state, each pole is excited in accordance with the number of poles by D.C. exciting current through the field winding. Thus, each produces the flux shown in FIGURE 2. The number of poles of the armature winding is made equal to the number of poles of the field winding because the machine is a synchronous machine and this characteristic normally is the manner in which synchronous machines are operated.

Heretofore, it has been believed necessary that the synchronous machines should be started in such a manner that the number of poles of the armature winding is equal to the number of poles of the field winding. Even though a synchronous machine is started as an asynchronous machine, the number of poles of both the field winding and the armature winding are kept equal to each other throughout the entire period of operation including both starting and after the machine has reached synchronous speed. The above-identified CIGRE Report discloses a machine and method for changing the number of poles in the field winding relative to the armature winding *during running*. As previously indicated, these known starting methods produce many difficulties, particularly with regard to the development of large voltages across the field winding.

This invention provides a novel method for starting a synchronous machine by employing *during the starting operation*, a known pole-number changing technique and apparatus identified above in such a manner that the number of poles of the armature winding always is made unequal to the number of poles of the field winding *during the starting operation*. As will be explained hereinafter, due to the nature of the connection of the known pole-number changing apparatus, the voltages induced in the several coils of the field winding cancel each other out in effect so that the voltage across the winding as a whole is kept substantially equal to zero. This considerable operating advantage can be readily achieved with the known apparatus identified above, and is contrary to the usual method of starting wherein equal numbers of poles are used in both the armature and field windings. The inventor found that if the field winding circuit is connected in $p_2$ poles when the armature winding is of $p_1$ poles, or if the field winding circuit is connected in $p_1$ poles when the armature winding is of $p_2$ poles. The turns of the field winding are so interconnected that the voltages induced in the individual coils of the windings cancel each other out and the sum of the voltages of all of the coils is essentially zero. Hence, the over voltage effect of field winding during the starting operation is nullified even though started as an asynchronous machine in the usual manner using a discharge resistor connected across the field windings, and possibly damper windings, etc.

If the armature winding is of $p_2=6$ poles during starting operation to produce a corresponding rotating field, and the field winding is in $p_1=8$-pole connection, the induced voltage becomes zero across the field winding terminals. A further explanation will be given assuming that the armature winding is of $p_1=8$ poles and the field winding is $p_2=6$ poles. The magnetomotive force wave produced by the armature winding is shown in FIG. 3a, assuming the armature winding has $p_2=6$ poles, of which the shaded portions correspond to the air gap flux wave, and provided that flux passes only through poles faces. FIG. 3b shows the case when the field winding circuit is in $p_1=8$-pole connection while FIG. 3c shows the case when the field winding circuit is in $p_2=6$-pole connection and thus equal to the $p_2=6$ connection of the armature and corresponds to the prior art.

This configuration of equal armature and field winding poles was previously explained in connection with FIGURE 2.

Since the armature winding is producing magnetic field wave with $p_2=6$-pole connection as shown in FIG. 3a, the induced voltages in field coils of respective magnetic poles are as shown in FIG. 3b where the rotor is in the $p_1=8$-pole connection, and the resultant induced voltage or the voltage across the field winding terminals is zero. On the other hand, with $p_2=6$-pole connection of the field winding, the terminal voltage is not zero but of a finite value 2e as shown in FIGURE 3c. In FIG. 3a, $\phi$ and $\phi'$ are amounts of magnetic fluxes at respective portions produced by the armature winding at certain instant, $e$ and $e'$ are voltages induced in respective field coils in correspondence with $\phi$ and $\phi'$, and plus and minus signs (+ and −) affixed are showing polarities of induced voltages which are dependent upon the manner of connection of the terminals of respective field coils. If the field coil terminals of magnetic pole 1 is plus (+), the field coil terminals of magnetic pole 2 is made minus (−), showing that the latter is of reversed polarity.

In the same manner, if the armature winding is of $p_1=8$-poles, and the field winding is in $p_2=6$-pole connection, the terminal voltage of field winding becomes zero. In both cases it can be seen that the resultant voltage is zero wherever the relation $p_1$ greater than $p_2$ ($p_1>p_2$) is maintained with respect to the number of poles of either the field winding relative to the stator winding, or vice versa. This is true even when voltages are induced in respective portions of the field winding, and consequently, electric breakdown of insulation is nullified or decreased wherever the number of stator winding poles either $p_2$ or $p_1$ is made unequal to the rotor winding poles either $p_1$ or $p_2$, respectively. This is in comparison to conventional synchronous machines in which induced voltages in respective rotor or field coils of $p_1$ or $p_2$ poles having equal $p_1$ or $p_2$ stator poles, respectively are added together. In addition, if by reason of the invention there is no current flowing through the field winding circuit, the starting torque is not decreased suddenly as in the case with the prior art methods. This is particularly true when the machine is operated with the armature winding of $p_2$-poles, and even if it is salient-pole construction. The starting characteristics by virtue of the damper windings are similar to those of cylindrical cage type rotors. That is to say, there is no pulsation of torque, resulting in extremely smooth starting characteristics.

As will be clear from the foregoing explanation, according to the method of the present invention, first, the connection of either the armature winding or the field winding is connected in such a manner that the number of poles of the armature winding is different from that of the field winding. Next, multiphase alternating voltage is applied to the armature winding. At this time, the field winding is not connected to a DC exciting system. When the speed of the machine comes close to synchronous speed, the connection of either the armature winding or field winding is further changed so as to operate in synchronous state where, of course, the number of poles of both the armature winding and the field winding are equal since this is an inherent requirement for synchronous operation.

From the foregoing description, it will be appreciated that according to the present invention, a salient pole synchronous machine is started with the field winding circuit in $p_2$-pole connection when the armature winding is of $p_1$-poles, or with the field winding circuit in $p_1$-pole connection when the armature winding is of $p_2$-poles. In other words, the machine is started in such a manner that the armature winding and field winding are different in number of poles from each other, thus eliminating the undesirable effect of the field winding on the starting operation.

It will be appreciated that when a synchronous machine of a large capacity is started as an asynchronous machine in accordance with the invention, there is no fear of insulation breakdown in the field windings of the machine because induced voltages in the windings cancel each other and the overall voltage appearing across the terminals of the windings is remarkably reduced or substantially zero. Hence no danger occurs when the field winding circuit is opened. Further, since no apparent current flows through the field winding circuit by induced voltage, the field windings have no substantial undesirable effect on the starting torque of the machine and an abrupt decrease in the middle of the starting operation due to current through the field winding is effectively avoided.

Having described the invention in connection with certain modifications thereof, it will now be understood that further modifications may suggest themselves to those skilled in the art and it is intended to cover such modifications as fall within the scope of the appended claims.

What is claimed is:

1. A method for starting a synchronous machine having damper windings for starting and a number of poles for the field winding and a number of poles for the armature winding, either one of said numbers of poles being made changeable, the turns of the field winding being so interconnected that the voltages induced in the individual coils of the windings cancel each other out and the sum of the voltages of all of the coils is essentially zero, the steps comprising changing the number of poles of either said field winding or said armature winding in such a manner that the number of effective poles of the armature winding is different from the number of effective poles of the field winding in advance of and during starting, and applying an alternating voltage to the armature winding to initiate starting.

2. A method for starting a synchronous machine according to claim 1, the steps further comprising changing either one of said numbers of poles when the speed of the machine comes close to the synchronous speed in such a manner that the number of poles of the armature winding is equal to the number of poles of the field winding.

3. A method for starting a double speed salient-pole type synchronous machine having damper windings for starting and armature winding poles the number of which is changeable between $p_1$ and $p_2$ where $p_1$ is any number greater than $p_2(p_1>p_2)$, and field winding salient poles the number of which is changeable between $p_1$ and $p_2$, the turns of the field winding being so interconnected that the voltages induced in the individual coils of the windings cancel each other out and the sum of the voltages of all of the coils is essentially zero, the steps comprising changing in advance of and during starting the number of poles of either said field winding or said armature winding in such a manner that the number of poles of either said field winding or said armature winding is $p_1$ when the number of poles of the other is $p_2$, and applying a multiphase alternating voltage to the armature winding to initiate starting.

4. A method for starting a double speed salient-pole type synchronous machine according to claim 3, the steps further comprising changing the number of poles of either said armature winding or field winding in such a manner that the numbers of poles of both said armature winding and said field winding are equal, when the speed of the machine comes close to the synchronous speed.

5. A method for starting a double speed salient-pole type synchronous machine according to claim 4, in which in advance of starting the number of poles of said field winding is $p_2$ and the number of poles of said armature winding is $p_1$.

6. A method for starting a double speed salient-pole type synchronous machine according to claim 4 in which in advance of starting the number of poles of said field winding is $p_1$ and the number of poles of said armature winding is $p_2$.

References Cited

UNITED STATES PATENTS

| | | | |
|---|---|---|---|
| 1,752,871 | 4/1930 | Wieseman | 318—173 |
| 1,770,871 | 7/1930 | Alger | 318—173 |
| 1,781,538 | 11/1930 | Creedy | 318—173 X |
| 1,970,914 | 8/1934 | Kolbourne | 318—173 X |
| 3,049,653 | 8/1962 | Rawcliffe | 318—173 |
| 3,175,141 | 3/1965 | Rawcliffe | 318—173 |

ORIS L. RADER, *Primary Examiner.*

G. RUBINSON, *Assistant Examiner.*